(12) United States Patent
Dumont et al.

(10) Patent No.: US 7,380,413 B2
(45) Date of Patent: Jun. 3, 2008

(54) METHOD AND INSTALLATION FOR SEPARATING A MIXTURE OF HYDROGEN AND CARBON MONOXIDE

(75) Inventors: Eric Dumont, Charenton-le-Pont (FR); Antoine Hernandez, Le Plessis-Trevise (FR)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 428 days.

(21) Appl. No.: 10/511,702

(22) PCT Filed: Apr. 14, 2003

(86) PCT No.: PCT/FR03/01174

§ 371 (c)(1),
(2), (4) Date: Jun. 13, 2005

(87) PCT Pub. No.: WO03/086965

PCT Pub. Date: Oct. 23, 2003

(65) Prior Publication Data

US 2005/0232854 A1    Oct. 20, 2005

(30) Foreign Application Priority Data

Apr. 15, 2002    (FR) .................... 02 04681

(51) Int. Cl.
*F25J 3/00* (2006.01)
*B01J 8/00* (2006.01)
*C01B 3/24* (2006.01)

(52) U.S. Cl. .............. 62/617; 62/931; 423/650; 48/127.9; 48/198.3

(58) Field of Classification Search ........... 62/617, 62/931; 423/650; 48/127.9, 128, 198.3
See application file for complete search history.

(56) References Cited

U.S. PATENT DOCUMENTS

| | | | | |
|---|---|---|---|---|
| 3,864,465 | A | * | 2/1975 | Hoffert ................... 62/4 |
| 4,052,176 | A | * | 10/1977 | Child et al. ............. 95/161 |
| 5,096,470 | A | * | 3/1992 | Krishnamurthy ......... 95/102 |
| 6,310,108 | B1 | * | 10/2001 | Bonneau et al. ......... 518/700 |
| 6,444,869 | B2 | * | 9/2002 | Senetar et al. .......... 585/809 |

FOREIGN PATENT DOCUMENTS

| EP | 0 359 629 | 3/1990 |
|---|---|---|
| EP | 0 790 212 | 8/1997 |
| EP | 0 837 031 | 4/1998 |
| EP | 1 245 533 | 10/2002 |
| GB | 1 217 706 | 12/1970 |

OTHER PUBLICATIONS

International Search Report for PCT/FR03/01174.

* cited by examiner

Primary Examiner—William C Doerrler
(74) Attorney, Agent, or Firm—Elwood Haynes

(57) ABSTRACT

A method for simultaneously producing hydrogen and carbon monoxide by subjecting synthesis gas to a decarbonation in a decarbonation unit, and to desiccation in a desiccation unit. After the decarbonation and the desiccation, the remaining synthesis gas components are cryogenically separated and a hydrogen-enriched gas is recycled upstream from the decarbonation unit and downstream from synthesis gas producing unit.

8 Claims, 2 Drawing Sheets

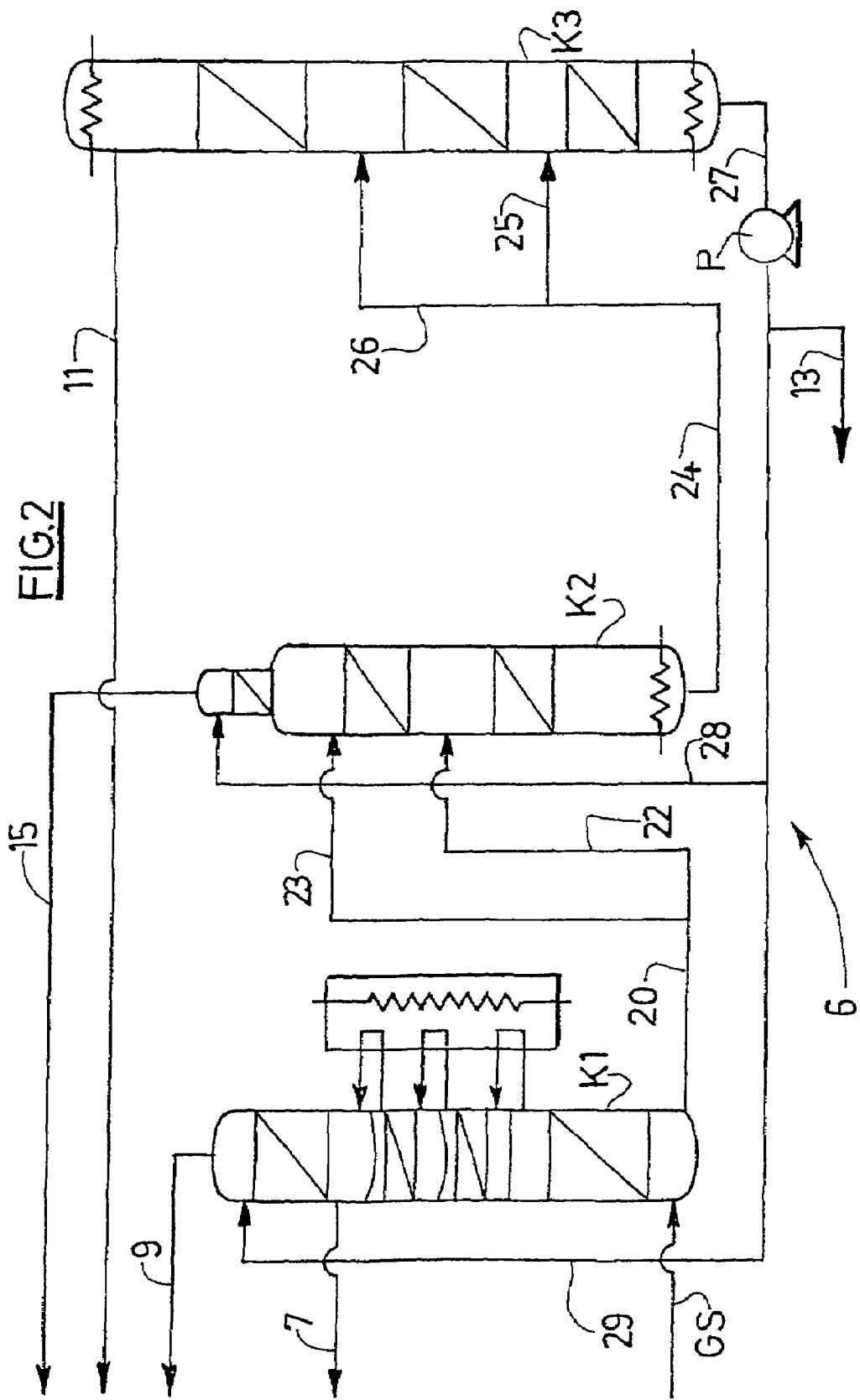

METHOD AND INSTALLATION FOR SEPARATING A MIXTURE OF HYDROGEN AND CARBON MONOXIDE

BACKGROUND

The present invention relates to a method and an installation for separating a mixture of hydrogen and carbon monoxide. In particular, it relates to a method for separating such a mixture using a step of separation by cryogenic distillation.

Carbon monoxide and hydrogen production units can be divided into two parts:

Generation of synthesis gas (mixture primarily containing $H_2$, $CO$, $CH_4$, $CO_2$ and $N_2$). Among the various industrial methods for producing synthesis gas, steam reforming is the most important. The design of this unit, which comprises a furnace, is based on the required production of CO and hydrogen.

Production of synthesis gas. This comprises:
an amine scrubbing unit to remove most of the $CO_2$ present in the synthesis gas;
a unit for purification on adsorbent bed. This unit generally comprises two bottles in continuous operation, one in production, the second in regeneration phase;
a unit for low temperature treatment by a cryogenic method (cold box) in order to produce carbon monoxide and hydrogen (possibly including a mixture of carbon monoxide and hydrogen called Oxogaz) in the quantities and purities required by the consumer. The most common method is scrubbing with liquid methane to obtain pure carbon monoxide with a recovery yield up to 99%, hydrogen the CO content of which generally varies between a few ppm and 1%, and a methane rich waste gas used as fuel.

Methods of this type are described in "Tieftemperaturtechnik" by Hausen et al., Springer-Verlag 1985 pp 417-419, EP-A-837031, EP-A-0359629, EP-A-0790212 and EP-A-1245533.

The thermodynamic equilibrium of the synthesis gas generation unit is favored by low pressure, which results in a lower consumption of raw material, while the synthesis gas purification unit is favored by high pressure in terms of equipment size and electric power consumption.

This is why, and due to the limitation of the operating pressure of reforming furnaces (which operate at a pressure below 45 bar abs.), it may be advantageous and/or necessary to incorporate a synthesis gas compressor in the synthesis gas purification line.

In most cases, the hydrogen produced by the cold box, containing up to 1 mol % of CO, is used as regeneration gas for the purification, and is then sent to an adsorbent purification unit (PSA) before being sent to the end consumer.

In the case in which the hydrogen produced by the cold box is sent directly to the consumer with a CO content specification of a few ppm, this gas can no longer be used as regeneration gas.

Also in the case in which a mixture of carbon monoxide and hydrogen is produced, generally containing 50% hydrogen, the quantity of hydrogen remaining as waste gas is too small to regenerate the purification; it is therefore necessary to find another gas as a regeneration gas.

SUMMARY

One of the current solutions is to produce a necessary quantity of additional hydrogen in the generation unit. This hydrogen present in the synthesis gas is treated in the purification unit and particularly in the methane scrubbing unit, is then used as regeneration gas for the purification, and finally utilized as fuel.

One subject of the invention is a method for simultaneously producing hydrogen and carbon monoxide, of the type in which a synthesis gas is received, such as a gas from hydrocarbon reforming, containing hydrogen and carbon monoxide, from a synthesis gas production unit, the synthesis gas is decarbonated in a decarbonation unit, and desiccated in a desiccation unit, followed by cryogenic separation of the remaining components, characterized in that a gas containing at least 60% hydrogen consisting of:

(i) a gas from the cryogenic separation and/or
(ii) a part of the synthesis gas is recycled upstream of the decarbonation unit and downstream of the synthesis gas production unit.

According to other optional aspects of the invention,
the gas containing at least 60% hydrogen is withdrawn at the top of a methane scrubbing column of the cryogenic separation unit, in which the remaining components are separated;
the gas containing at least 60% hydrogen is a portion of the gas with the highest hydrogen purity produced;
the gas containing at least 60% of hydrogen is used to regenerate the desiccation unit before being sent upstream of the decarbonation unit;
the synthesis gas purified in the decarbonation unit is compressed in a compressor before being sent to the desiccation unit;
another gas enriched with hydrogen is sent from the cryogenic separation upstream of the compressor and downstream of the decarbonation unit.

A further aspect of the invention provides for an installation for simultaneously producing hydrogen and carbon monoxide comprising a synthesis gas production unit, a decarbonation unit, a desiccation unit and a cryogenic separation unit, and means connecting the synthesis gas production unit with the decarbonation unit, the decarbonation unit with the desiccation unit and the desiccation unit with the cryogenic separation unit, and means for withdrawing hydrogen and carbon monoxide as products, characterized in that it comprises means for recycling a gas containing at least 60% hydrogen consisting of:

(i) a gas enriched with hydrogen, from the cryogenic separation unit and/or
(ii) a portion of the synthesis gas upstream of the decarbonation unit and downstream of the synthesis gas production unit.

The means for recycling the gas are preferably connected both to a point upstream of the desiccation unit and downstream of the synthesis gas production unit, and at the cryogenic separation unit or a point upstream of the cryogenic separation unit.

According to other optional aspects of the invention, the installation comprises:
compression means downstream of the decarbonation means.
means for sending the hydrogen enriched gas to the desiccation unit.
means for sending a gas enriched with hydrogen from the stripping column downstream of the decarbonation unit.

The cryogenic separation unit can comprise a methane scrubbing column, a stripping column, a rectifying column and means for withdrawing the hydrogen enriched gas from the methane scrubbing column. Other types of unit can be considered, such as a partial condensation unit.

In the case of the presence of a synthesis gas compressor, the innovation proposed consists in installing a hydrogen rich gas recycle loop between the cold box and upstream of the amine scrubbing unit.

This hydrogen rich gas, produced at the outlet of the cold box by the liquid methane scrubbing column, is used as purification regeneration gas, expanded and sent upstream of the amine scrubbing unit, to be mixed with the synthesis gas from the generation unit.

No excess hydrogen must be produced.

This has the result of reducing the size of the synthesis gas generation unit by about 5% to 15%.

Another advantage is the recovery of the quantity of CO co-adsorbed in the purification unit, which returns to the synthesis gas loop. This has the result of increasing the carbon monoxide recovery rate by about 0.5%.

The flash gas from the cold box can also be recycled upstream of the synthesis gas compressor to improve the CO yield of the unit.

All the percentages given herein are molar percentages and the pressures are absolute pressures.

BRIEF DESCRIPTION OF THE DRAWINGS

For a further understanding of the nature and objects for the present invention, reference should be made to thefollowing detailed description, taken in conjunction with the accompanying drawings, in which like elements are given the same or analogous reference numbers and wherein:

FIG. 2 illustrates a cryogenic separation apparatus capable of being incorporated in the embodiment illustrated in FIG. 1.

DESCRIPTION OF THE PREFERRED EMBODIMENTS

Figure 1:
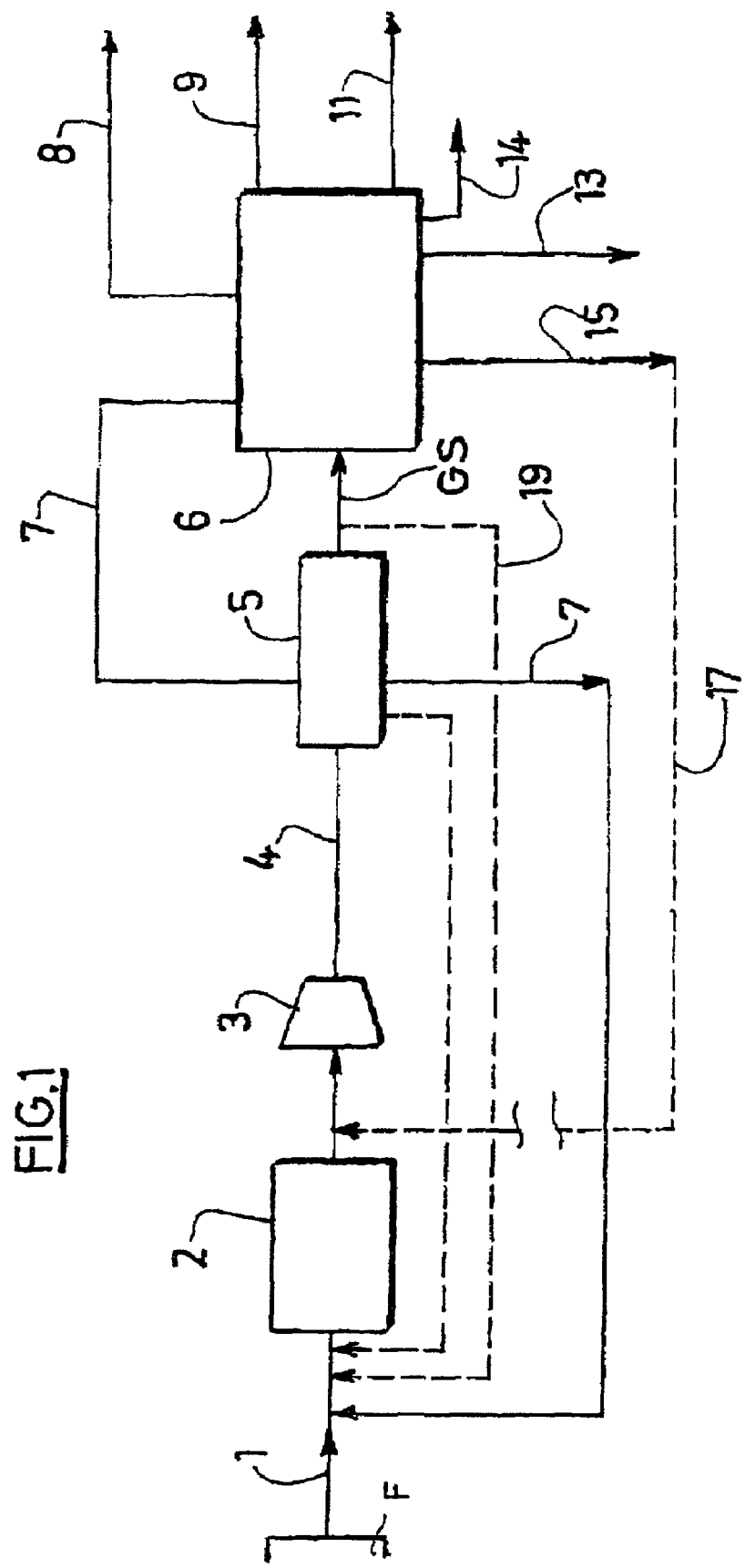
FIG. 1 illustrates a schematic view of synthesis gas separation, as per one embodiment of the current invention.

In FIG. 1, a synthesis gas stream 1 at about 16 bar from a steam reforming furnace F is separated in an amine scrubbing unit 2 to remove the carbon dioxide.

This product is then compressed in a compressor 3 to a pressure between 18 and 43 bar abs. The compressed stream 4 is stripped of water in a purification unit 5 to produce a gas flow rate of 55500 $Sm^3/h$ containing 62% hydrogen, less than 1% nitrogen, 35% carbon monoxide and 3% methane.

This stream is then separated in a cryogenic separation apparatus to produce a gaseous product 8 of 25400 $Sm^3/h$ constituting a mixture of carbon monoxide and hydrogen (typically 50% hydrogen and slightly over 49% carbon monoxide), a gaseous product 9 of 18700 $Sm^3/h$ rich in hydrogen (typically 99% hydrogen), a gaseous product 11 of 6500 $Sm^3/h$ rich in carbon monoxide (typically 99% carbon monoxide), a methane purge 13, a hydrogen rich gas 7 and a flash gas 15 of 1300 $Sm^3/h$ (typically containing 95% hydrogen, 1% carbon monoxide and 4% methane). A stream of 1700 $Sm^3/h$ of stage gas 14 containing over 98% hydrogen is sent to an expansion turbine.

The stream 7 of 6800 $Sm^3/h$ is sent to the purification unit 5 and is used to regenerate one of the adsorbent beds thereof and then, saturated with water, it is mixed with the synthesis gas upstream of the amine scrubbing unit 2.

Optionally, a portion 17 of the waste gas 15 can be recycled upstream of the compressor 3 and upstream or downstream of the amine scrubbing unit 2.

The pure hydrogen product 9 is sold directly as pure product without purification by a PSA unit. The streams of flash gas 15 and methane purge 13 are too small to regenerate the purification 5. The methane purge 13 can advantageously be sent to the inlet of the furnace F.

This recycling of hydrogen rich gas 7 serves to reduce the size of the steam reforming furnace by nearly 10% and to increase the CO yield by 0.5%.

As a variant or in addition, a portion 19 of the synthesis gas GS can be separated downstream of the desiccation unit 5 and sent upstream of the decarbonation unit 2. This stream 19 can also be used to regenerate the desiccation unit 5 before being mixed with the untreated synthesis gas 1.

This has the advantage of serving to reduce the size of the cold box of the cryogenic separation unit 6.

FIG. 2 shows an apparatus 6 for separating the synthesis gas by cryogenic distillation. The streams having the same reference numerals as those in FIG. 1 correspond to the streams designated in FIG. 1. The apparatus comprises a methane scrubbing column K1, a stripping column K2 and a rectifying column K3. The cooled and purified synthesis gas GS is sent to the bottom of the methane scrubbing column K1. Two hydrogen enriched streams are withdrawn from the column, including a stream 9 and a stream 7 withdrawn a few theoretical trays below the stream 9.

The liquid stream 20 enriched with methane and carbon monoxide is separated into a liquid stream 22 and a two-phase stream 23 and sent to the column K2. The stream 23 is sent directly to the column K2, while the stream 22 is partially vaporized (not shown) before being sent to the column K2.

A hydrogen enriched gas 15 is withdrawn at the top of the stripping column K2. At the bottom of the stripping column K2, a stream 24 containing mainly carbon monoxide and methane is withdrawn, sub-cooled (not shown) and separated into two streams 25 and 26. The stream 25 is sent directly to the column K3, the stream 26 is vaporized (not shown) and sent to the column K3. The carbon monoxide rich product 11 is withdrawn at the top of the column K3. A liquid methane stream 27 is withdrawn at the bottom of the column K3 and then pressurized in a pump P, divided into two and sent partly to the top of the stripping column K2 and the remainder is sent to the top of the methane scrubbing column K1, the stream 13 constituting the methane purge.

The reboiling at the bottom of the columns K2 and K3 and the condensation at the top of the column K3 is provided in a known manner by a carbon monoxide cycle (not shown).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for simultaneously producing hydrogen and carbon monoxide, said method comprising:
    a) receiving a synthesis as from a synthesis gas production unit, wherein said synthesis gas comprises hydrogen and carbon monoxide;
    b) decarbonating said synthesis gas in a decarbonation unit;

c) desiccating said synthesis gas in a desiccation unit;
d) cryogenically separating said desiccated synthesis gas in a cryogenic separation unit; and
e) recycling a gas, containing at least about 60% hydrogen, upstream of said decarbonation unit and downstream of said synthesis gas production unit, wherein said gas to be recycled comprises at least one member selected from the group consisting of:
  1) a gas from said cryogenic separation; and
  2) a portion of a gas upstream of said cryogenic separation unit;
further comprising regenerating said desiccation unit with said gas containing at least about 60% hydrogen prior to sending said gas containing at least about 60% hydrogen upstream of said decarbonation unit.

2. A method which may be used for simultaneously producing hydrogen and carbon monoxide, said method comprising:
  a) receiving a synthesis gas from a synthesis gas production unit, wherein said synthesis gas comprises hydrogen and carbon monoxide;
  b) decarbonating said synthesis gas in a decarbonation unit;
  c) desiccating said synthesis gas in a desiccation unit;
  d) cryogenically separating said desiccated synthesis gas in a cryogenic separation unit; and
  e) recycling a gas, contain in at least about 60% hydrogen up stream of said decarbonation unit and downstream of said synthesis gas production unit, wherein said gas to be recycled comprises at least one member selected from the group consisting of:
    1) a gas from said cryogenic separation; and
    2) a portion of a gas upstream of said cryogenic se aration unit;
further comprising compressing said decarbonated synthesis gas in a compressor prior to sending said decarbonated synthesis gas to said desiccation unit.

3. The method of claim 1, further comprising sending a second gas to a location upstream of said compressor and downstream of said decarbonation unit, wherein said second gas is enriched with hydrogen from said cryogenic separation.

4. An apparatus which may be used for simultaneously producing hydrogen and carbon monoxide, said apparatus comprising
  a) a means for receiving a synthesis gas from a synthesis as production unit;
  b) a decarbonation unit;
  c) a desiccation unit;
  d) a cryogenic separation unit;
  e) a means for connecting said synthesis as production unit with said decarbonation unit;
  f) a means for connecting said decarbonation unit with said desiccation unit;
  g) a means for connecting said desiccation unit with said cryogenic separation unit; and
  h) a means for withdrawing hydrogen and carbon monoxide as products. wherein said withdrawing means comprises a means for recycling a gas containing at least about 60% hydrogen, wherein said gas to be recycled comprises at least one member selected from the group consistin of:
    1) a gas from said cryogenic separation; and
    2) a portion of a gas upstream of said cryogenic separation unit;
wherein said products are withdrawn upstream of said decarbonation unit and down stream of said synthesis gas production unit.

5. An apparatus which may be used for substantially simultaneously producing hydrogen and carbon monoxide, said apparatus comprising
  a) a means for receiving a synthesis gas from a synthesis gas production unit;
  b) a decarbonation unit;
  c) a desiccation unit;
  d) a cryogenic separation unit;
  e) a means for connecting said synthesis gas production unit with said decarbonation unit;
  f) a means for connecting said decarbonation unit with said desiccation unit;
  g) a means for connecting said desiccation unit with said cryogenic separation unit; and
  h) a means for withdrawing hydrogen and carbon monoxide as products, wherein said withdrawing means comprises a means for recycling a gas containing at least about 60% hydrogen, wherein said gas to be recycled comprises at least one member selected from the group consisting of:
    1) a gas from said cryogenic separation; and
    2) a portion of a gas upstream of said cryogenic separation unit;
further comprising a compression means located downstream of said decarbonation means.

6. An apparatus which may be used for and carbon monoxide, said apparatus comprising
  a) a means for receiving a synthesis gas from a synthesis as production unit;
  b) a decarbonation unit;
  c) a desiccation unit;
  d) a cryogenic separation unit;
  e) a means for connnecting said synthesis gas production unit with said decarbonation unit;
  f) a means for connecting said decarbonation unit with said desiccation unit;
  g) a means for connecting said desiccation unit with said cryogenic separation unit; and
  h) a means for withdrawing hydrogen and carbon monoxide as products, wherein said withdrawing means comprises a means for recycling a gas containing at least about 60% hydrogen, wherein said gas to be recycled comprises at least one member selected from the group consisting of:
    1) a gas from said cryogenic separation; and
    2) a portion of a gas upstream of said cryogenic separation unit;
further comprising a means for sending said hydrogen enriched gas to said desiccation unit.

7. An apparatus which may be used for substantially simultaneously producing hydrogen and carbon monoxide, said apparatus comprising
  a) a means for receiving a synthesis gas from a synthesis gas production unit;
  b) a decarbonation unit;
  c) a desiccation unit;
  d) a cryogenic separation unit;
  e) a means for connecting said synthesis gas production unit with said decarbonation unit;
  f) a means for connecting said decarbonation unit with said desiccation unit;

g) a means for connecting said desiccation unit with said cryogenic separation unit; and
h) a means for withdrawing hydrogen and carbon monoxide as products,
   wherein said withdrawing means comprises a means for recycling a gas containing at least about 60% hydrogen, wherein said gas to be recycled comprises at least one member selected from the group consisting of:
   1) a gas from said cryogenic separation; and
   2) a portion of a gas upstream of said cryogenic separation unit;

wherein said cryogenic separation unit comprises:
   a) a methane scrubbing column;
   b) a stripping column;
   c) a rectifying column; and
   d) a means for withdrawing said hydrogen enriched gas from said methane scrubbing column.

8. The apparatus of claim 7, further comprising a means for sending a hydrogen enriched gas from the stripping column to a location downstream of said decarbonation unit.

* * * * *

UNITED STATES PATENT AND TRADEMARK OFFICE
CERTIFICATE OF CORRECTION

| | | |
|---|---|---|
| PATENT NO. | : 7,380,413 B2 | Page 1 of 1 |
| APPLICATION NO. | : 10/511702 | |
| DATED | : June 3, 2008 | |
| INVENTOR(S) | : Eric Dumont et al. | |

It is certified that error appears in the above-identified patent and that said Letters Patent is hereby corrected as shown below:

In Column 4, line 63, Column 5, line 47, Column 5, line 51, and in Column 6, line 32, replace the words "synthesis as" with the words --synthesis gas--.

In Column 5, line 27, replace the words "contain in" with the word --containing--.

In Column 5, line 27, insert a --,-- after the word "hydrogen".

In Column 5, line 58, replace the "." with a "," after the word "products".

In Column 5, line 62, replace the word "consistin" with the word --consisting--.

In Column 6, line 29, after the word "for" insert the words --substantially simultaneously producing hydrogen--.

Signed and Sealed this
First Day of May, 2012

David J. Kappos
*Director of the United States Patent and Trademark Office*